Jan. 11, 1949.  F. A. MILLER  2,458,622
STUD DRIVER
Filed March 19, 1945  2 Sheets-Sheet 1

INVENTOR.
Frank Alden Miller
BY Victor J. Evans & Co.
ATTORNEYS

Jan. 11, 1949.  F. A. MILLER  2,458,622
STUD DRIVER
Filed March 19, 1945  2 Sheets-Sheet 2
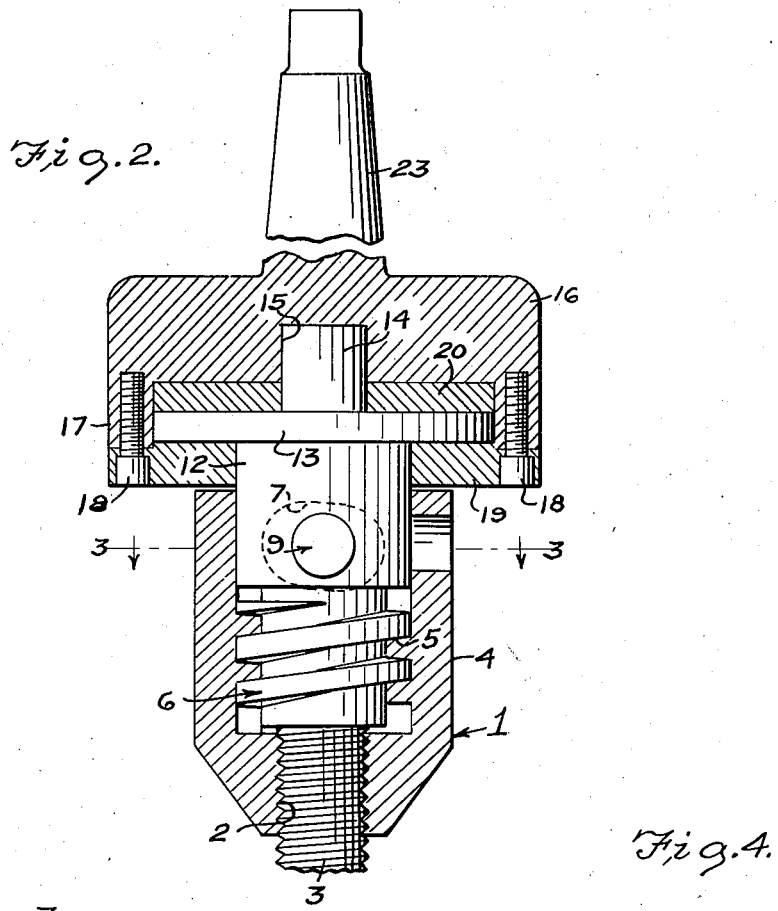
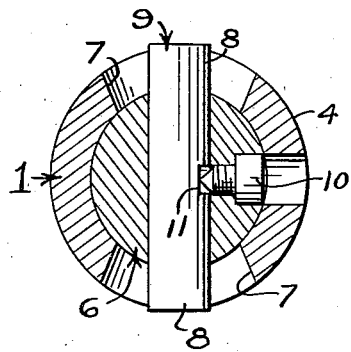
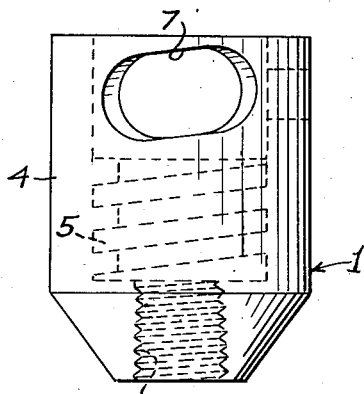
INVENTOR.
Frank Alden Miller
BY Victor J. Evans & Co.
ATTORNEYS Patented Jan. 11, 1949

2,458,622

UNITED STATES PATENT OFFICE 2,458,622

STUD DRIVER

Frank Alden Miller, Buffalo, N. Y., assignor to Buffalo Machinery Company, Incorporated, Buffalo, N. Y., a corporation of New York Application March 19, 1945, Serial No. 583,569

1 Claim. (Cl. 81—53)

My present invention, in its broad aspect, has to do with improvements in devices for driving threaded studs, and releasing such studs automatically when the driver is to be backed off of the stud, and more particularly it is my purpose to not only quickly and efficiently drive studs and release such studs, but also to prevent application of excessive strain on a stud by providing an over-ride clutch device whereby my device is prevented from twisting or turning the stud off. In attaining the above and other objects and advantages, I provide a threaded chuck for engaging the threaded stud and a threaded stop member having limited movement by virtue of a stop pin in a cam slot for engaging and releasing the stud, and the stop member having driving engagement with the chuck and carrying one element of a friction or over-ride clutch engaging another element of the clutch interpolated between the first clutch element and the driving head of the stud driver, whereby a predetermined application of power is imparted to the chuck for driving a stud, but not enough power to twist the stud off. My chuck, driving device, stop and release mechanism and clutch are all improved and unique and greatly simplified, and all of the parts are sturdy, simple and efficient.

Other and equally important objects and advantages of my invention will be apparent from the following description and drawings, but it is to be understood that changes in form, size, shape, materials, and arrangement and construction of parts is permissible and within the purview of my broad inventive concept, and the scope of the appended claim.

In the drawings wherein I have illustrated a preferred form of my invention:

Figure 2 is a longitudinal section with my device turned 180°;

Figure 3 is a section on the line 3—3 of Figure 2;

Figure 4 is a view of the chuck and sleeve;

In the drawings wherein like characters of reference are used to designate like or similar parts throughout the several views:

Figure 1:
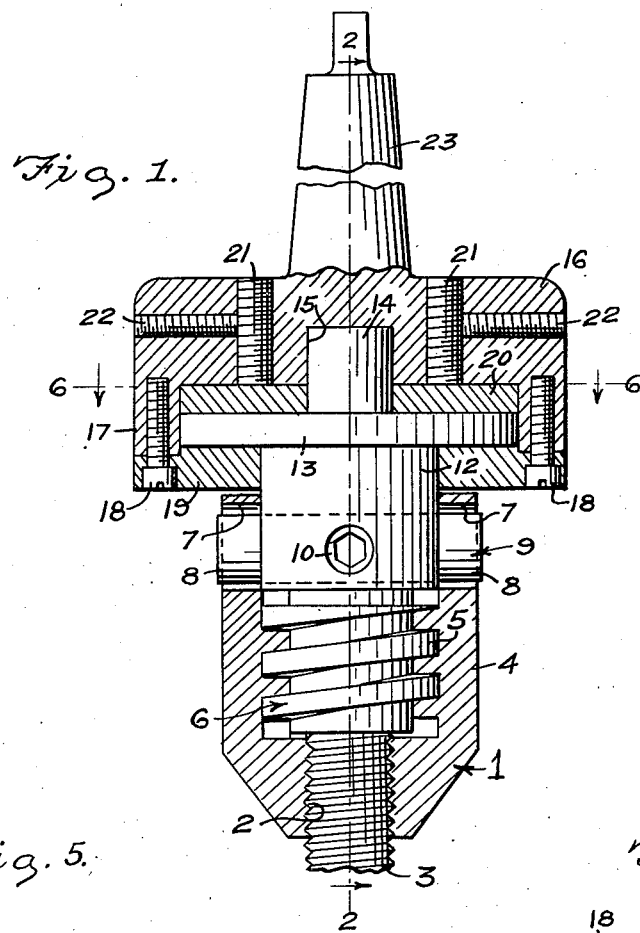
Figure 1 is a longitudinal section.
Figure 5:
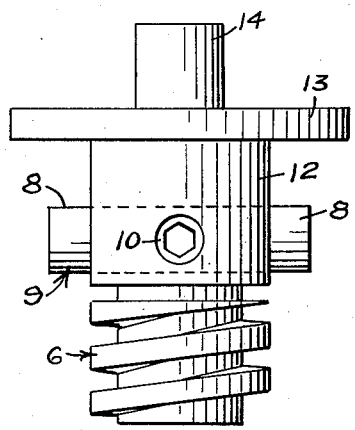
Figure 5 is a view of the driving, and stop and release device with one element of the over-ride clutch.
Figure 6:
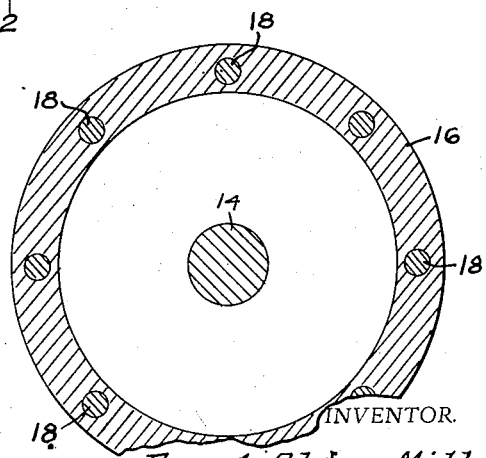
Figure 6 is a section on the line 6—6 of Figure 1.

The numeral 1 designates the chuck of my stud driver which is formed with a sleeve internally threaded at 2 to engage the stud 3. The chuck has a sleeve portion 4 formed with internal, relatively large quick threads 5 to receive the threaded, combined driving member and stop 6 which provides a pressure plug. The sleeve has angular or camming slots 7 which are diametrically opposed to each other to receive the ends 8 of a stop pin 9 mounted in a bore in the pressure plug 6 and held in place by a threaded locking pin 10 which engages in a recess 11 in the pin. Upon the upper unthreaded end 12 of the plug 6 is a clutch plate or circular head 13, and rising centrally of the plate or disc is a guide pin 14 which fits into a centering bore 15 in the circular driving head 16. The driving head is annularly and downwardly flanged as at 17, and mounted by bolts 18 in the flange is a face or cover plate 19 which has a central opening to receive the unthreaded end 12 of the member 6. A bronze (or other suitable metal) clutch plate or friction disc 20 is disposed on the pin 14 and fits between the driving head 16 and the clutch plate or disc 13. Threaded studs 21 extend through the driving head to engage against the disc 20 to adjust the same, and these are locked in adjusted position by threaded locking studs 22. A shank 23 extends from the driving head 16 to be engaged by a suitable drive shaft or the like (not shown).

In the operation the chuck is threaded on the stud, and upon turning of the member 6 on threads 5 to the limit defined by the irregularity of slots 7 the stud is engaged by the member 6 and locked for turning. The over-ride or friction clutch represented by discs 13, 20 and the head 16 provides slip in the event the power is excessive such as might turn the stud off. To release the stud, the member 6 is backed away to the limit of angularity of slots 7 to release the stud whereupon the chuck may be unthreaded therefrom without danger of backing the stud out. The flange 17 and face or cover plate 19 form a dustproof enclosure for the clutch elements.

From the foregoing it is believed that the operation and advantages of my invention will be apparent, but it is again emphasized that interpretation of the scope thereof should only be conclusive when made in the light of the subjoined claim.

I claim:

A stud driver core comprising a cylindrical body having square threads on the lower stud-engaging end thereof, an enlarged disc providing a head on the upper end and a centrally disposed positioning pin extended from the disc and axially aligned with the said cylindrical body and square threads thereon, said cylindrical body having a transversely disposed pin-receiving opening therethrough positioned perpendicular to the axis thereof and a countersunk threaded set screw socket extended inward from one side and in the same plane as that of the said pin receiving opening, a pin having a notch in the side thereof positioned in said pin receiving opening of the cylindrical body with the ends extended from opposite sides of said body and with the notch therein registering with said set screw socket, a countersunk head set screw threaded in said socket with the end thereof extended into the notch of the pin and with the outer surface of the head within the peripheral surface of the said cylindrical body, a sleeve positioned on and carried by said cylindrical body having internal square threads to receive the said threads of the body, inclined slots in which the extended ends of the pin are positioned and a threaded stud receiving socket in the lower end, a driving head having a mounting shank thereon with a socket in the lower end thereof for receiving the disc on the upper end of the said cylindrical body, and a friction disc in said driving head positioned to coact with the disc forming the head of said cylindrical body.

FRANK ALDEN MILLER.

REFERENCES CITED

The following references are of record in the file of this patent:

UNITED STATES PATENTS

| Number | Name | Date |
|---|---|---|
| 458,408 | Schwanhausser | Aug. 25, 1891 |
| 702,934 | Errington | June 24, 1902 |
| 1,298,324 | Funk | Mar. 25, 1919 |
| 1,536,320 | Ziegler | May 5, 1925 |
| 1,898,726 | Hess | Feb. 21, 1933 |
| 2,305,637 | Ricciardi | Dec. 22, 1942 |

FOREIGN PATENTS

| Number | Country | Date |
|---|---|---|
| 13,979 | Great Britain | June 15, 1909 |